（12）United States Patent
Sander et al.

(10) Patent No.: US 10,837,637 B2
(45) Date of Patent: Nov. 17, 2020

(54) GAS TURBINE ENGINE HAVING A HEAT SHIELD

(71) Applicant: United Technologies Corporation, Farmington, CT (US)

(72) Inventors: David J. Sander, South Windsor, CT (US); Jonathan Lemoine, Vernon, CT (US); Harvey C. Lee, Newington, CT (US); Dalton C. Petrillo, Norwich, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 988 days.

(21) Appl. No.: 15/076,769

(22) Filed: Mar. 22, 2016

(65) Prior Publication Data

US 2017/0276355 A1 Sep. 28, 2017

(51) Int. Cl.
*F23R 3/00* (2006.01)
*F01D 9/02* (2006.01)
*F01D 25/24* (2006.01)
*F01D 25/14* (2006.01)
*F23R 3/60* (2006.01)
*F01D 9/04* (2006.01)
(Continued)

(52) U.S. Cl.
CPC .............. *F23R 3/002* (2013.01); *F01D 9/023* (2013.01); *F01D 9/042* (2013.01); *F01D 25/145* (2013.01); *F01D 25/243* (2013.01); *F01D 25/246* (2013.01); *F02C 3/04* (2013.01); *F23R 3/60* (2013.01); *F01D 11/005* (2013.01); *F05D 2230/642* (2013.01); *F05D 2240/15* (2013.01); *F05D 2250/192* (2013.01); *F05D 2260/231* (2013.01); *F05D 2260/31* (2013.01)

(58) Field of Classification Search
CPC ...... F01D 9/023; F01D 11/005; F01D 25/243; F01D 25/246
See application file for complete search history.

(56) References Cited

U.S. PATENT DOCUMENTS 3,965,066 A * 6/1976 Sterman ................. F01D 9/023
60/800
5,224,822 A * 7/1993 Lenahan ................. C23C 30/00
415/177
(Continued)

FOREIGN PATENT DOCUMENTS

EP 2325563 A2 5/2011
EP 2775102 A2 9/2014
(Continued)

OTHER PUBLICATIONS

Official Communication from the European Patent Office for related EP Application No. 17162443.0 dated Jul. 28, 2017; 8 pages.

*Primary Examiner* — Todd E Manahan
*Assistant Examiner* — Katheryn A Malatek
(74) *Attorney, Agent, or Firm* — Cantor Colburn LLP

(57) ABSTRACT

A heat shield provided with a gas turbine engine includes a heat shield body extending between a first heat shield end and a second heat shield end. The heat shield body has an exterior surface disposed proximate an inner surface of a first case and an interior surface disposed opposite the exterior surface. The interior surface defines a rib that extends towards a combustor vane support lock.

14 Claims, 3 Drawing Sheets

(51) Int. Cl.
*F02C 3/04* (2006.01)
*F01D 11/00* (2006.01)

(56) References Cited

U.S. PATENT DOCUMENTS

| | | | |
|---|---|---|---|
| 5,238,365 A | 8/1993 | Petsche | |
| 5,848,874 A * | 12/1998 | Heumann | F01D 9/042 |
| | | | 415/189 |
| 6,126,390 A * | 10/2000 | Bock | F01D 11/18 |
| | | | 415/115 |
| 6,347,508 B1 * | 2/2002 | Smallwood | F01D 9/023 |
| | | | 60/796 |

FOREIGN PATENT DOCUMENTS

| | | | |
|---|---|---|---|
| FR | 2510220 A1 | 1/1983 |
| WO | 2013165868 A1 | 11/2013 |
| WO | 2014201247 A1 | 12/2014 |

* cited by examiner

GAS TURBINE ENGINE HAVING A HEAT SHIELD

BACKGROUND

The present disclosure relates to a gas turbine engine having a heat shield.

Gas turbine engines generally include a compressor section, a combustor section, and a turbine section disposed within a single case or multiple cases connected to each other. The case or cases may be subject to relatively high temperatures as a result of an operating temperature of the combustor section.

BRIEF DESCRIPTION

According to an embodiment of the present disclosure, a gas turbine engine is provided. The gas turbine engine includes a first case, a second case, a turbine vane support, and a heat shield. The first case has a first case first end and a first case second end that defines a first flange. The second case has a second case first end and a second case second end. The second case first end defines a second flange that abuts the first flange. The turbine vane support extends between a turbine vane and the first case. The heat shield is disposed adjacent to the turbine vane support. The heat shield has an exterior surface disposed proximate an inner surface of the first case and an interior surface facing towards a combustor.

In addition to one or more of the features described above, or as an alternative to any of the foregoing embodiments, the inner surface of the first case defines a first protrusion and defines a second protrusion spaced apart from the first protrusion.

In addition to one or more of the features described above, or as an alternative to any of the foregoing embodiments, the first protrusion engages the exterior surface of the heat shield proximate a first heat shield end and the second protrusion engages the exterior surface of the heat shield proximate a second heat shield end.

In addition to one or more of the features described above, or as an alternative to any of the foregoing embodiments, the inner surface of the first case defines an axial stop that extends towards the combustor.

In addition to one or more of the features described above, or as an alternative to any of the foregoing embodiments, the axial stop is disposed proximate a first heat shield end.

In addition to one or more of the features described above, or as an alternative to any of the foregoing embodiments, the gas turbine engine further includes a combustor vane support lock disposed adjacent to the turbine vane support, wherein the heat shield engages the combustor vane support lock.

In addition to one or more of the features described above, or as an alternative to any of the foregoing embodiments, the heat shield defines a rib that extends from the interior surface and extends into the combustor vane support lock proximate a second heat shield end.

According to another embodiment of the present disclosure, a gas turbine engine is provided. The gas turbine engine includes a first case, a combustor vane support lock, and a heat shield. The first case has an inner surface that extends between a first case first end and a first case second end. The combustor vane support lock is coupled to a turbine vane support by a fastener that extends through the combustor vane support lock and is received within a turbine vane support disposed adjacent to the combustor vane support lock. The heat shield has a first heat shield end, a second heat shield end, and exterior surface that extends between the first heat shield end and the second heat shield end, and an interior surface disposed opposite the exterior surface that extends between the first heat shield end and the second heat shield end. The interior surface defines a rib that extends towards the combustor vane support lock.

In addition to one or more of the features described above, or as an alternative to any of the foregoing embodiments, the rib is disposed proximate the second heat shield end.

In addition to one or more of the features described above, or as an alternative to any of the foregoing embodiments, the combustor vane support lock defines a slot configured to receive the rib of the heat shield.

In addition to one or more of the features described above, or as an alternative to any of the foregoing embodiments, the interior surface of the heat shield defines a ramped region that extends from the first heat shield end towards the second heat shield end.

In addition to one or more of the features described above, or as an alternative to any of the foregoing embodiments, the exterior surface of the heat shield defines a heat shield protrusion that is disposed proximate the first heat shield end.

In addition to one or more of the features described above, or as an alternative to any of the foregoing embodiments, the inner surface of the first case defines a first protrusion disposed proximate a first case first end and a second protrusion disposed proximate a first case second end.

In addition to one or more of the features described above, or as an alternative to any of the foregoing embodiments, the first protrusion engages the exterior surface of the heat shield proximate a first heat shield end and the second protrusion engages the exterior surface of the heat shield proximate a second heat shield end.

According to yet another embodiment of the present disclosure, a heat shield provided with a gas turbine engine is provided. The heat shield includes a heat shield body extending between a first heat shield end and a second heat shield end. The heat shield body has an exterior surface disposed proximate an inner surface of a first case and an interior surface disposed opposite the exterior surface. The interior surface defines a rib that extends towards a combustor vane support lock.

In addition to one or more of the features described above, or as an alternative to any of the foregoing embodiments, the rib is disposed proximate the second heat shield end.

In addition to one or more of the features described above, or as an alternative to any of the foregoing embodiments, the rib is received within a slot defined by the combustor vane support lock.

In addition to one or more of the features described above, or as an alternative to any of the foregoing embodiments, the rib inhibits axial movement of the heat shield relative to the first case.

In addition to one or more of the features described above, or as an alternative to any of the foregoing embodiments, the interior surface defines a ramped region that extends from the first heat shield end towards the second heat shield end.

In addition to one or more of the features described above, or as an alternative to any of the foregoing embodiments, the interior surface is at least partially provided with a thermal barrier coating.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

Figure 1:
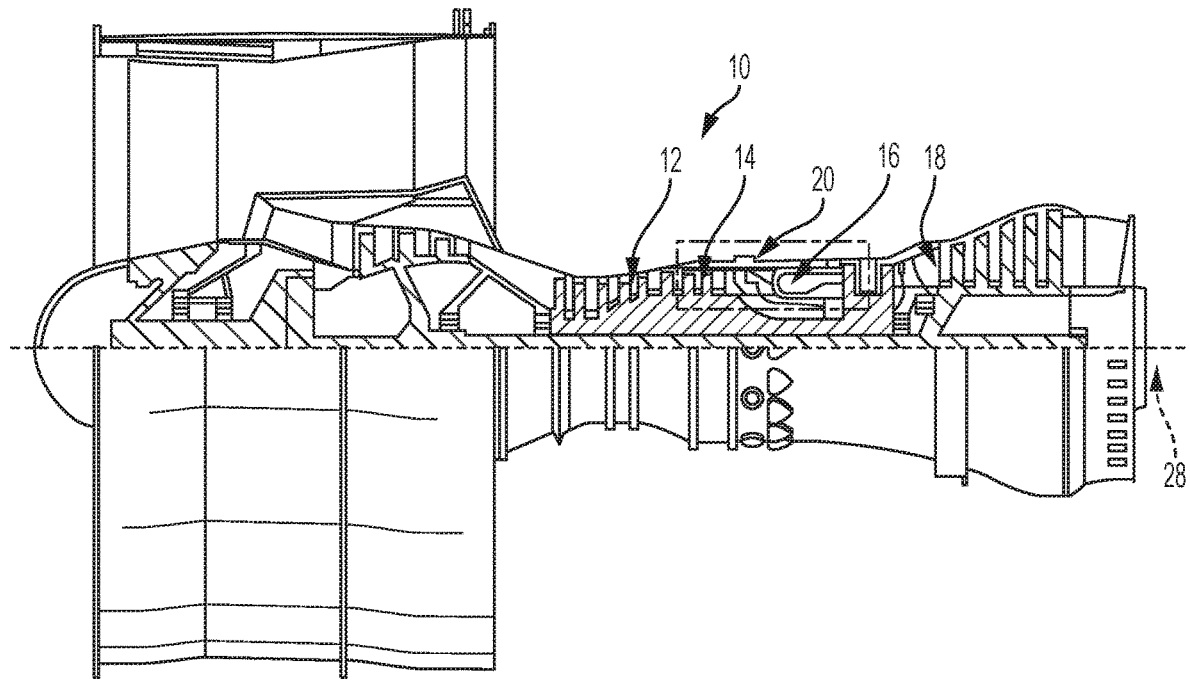
FIG. 1 is a partial side view of a gas turbine engine.
Figure 2:
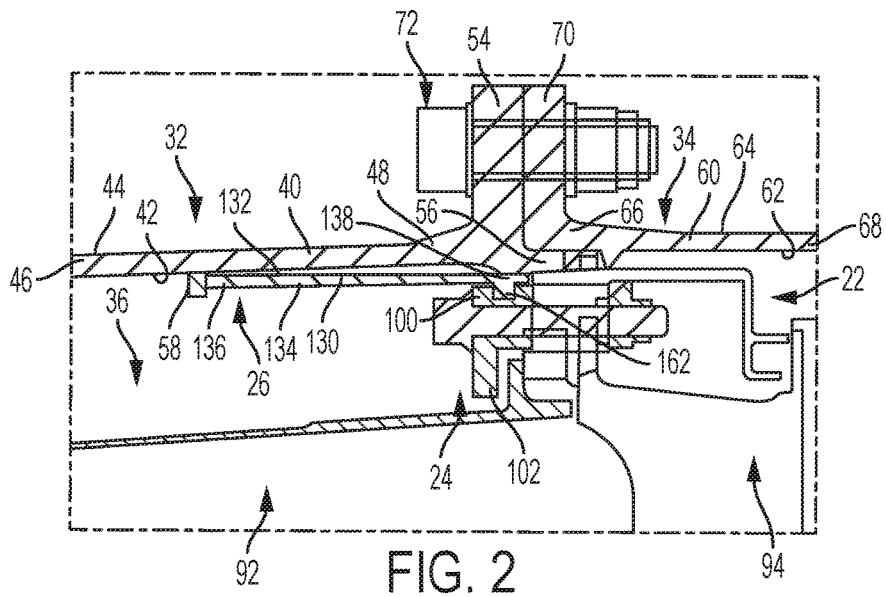
FIG. 2 is a first partial side view of the gas turbine engine proximate a diffuser/combustor section.

Referring to FIGS. 1 and 2 a gas turbine engine 10 is shown. The gas turbine engine 10 includes a compressor section 12, a diffuser section 14, a combustor section 16, a turbine section 18, a case assembly 20, a turbine vane support 22, a combustor vane support lock 24, and a heat shield 26. The compressor section 12 is disposed adjacent to the diffuser section 14. The diffuser section 14 is disposed adjacent to the combustor section 16. The combustor section 16 is disposed adjacent to the turbine section 18. The compressor section 12, the diffuser section 14, the combustor section 16, and the turbine section 18 are all axially disposed relative to each other along a longitudinal axis 28.

During operation of the gas turbine engine 10, ambient air enters through an inlet of the gas turbine engine 10 and is compressed by the compressor section 12. The compressed air is provided to the diffuser section 14 and is subsequently provided to the combustor section 16 that further heats the compressed air. The heated compressed air is provided to the turbine section 18 that extracts energy from the heated compressed air.

Figure 3:
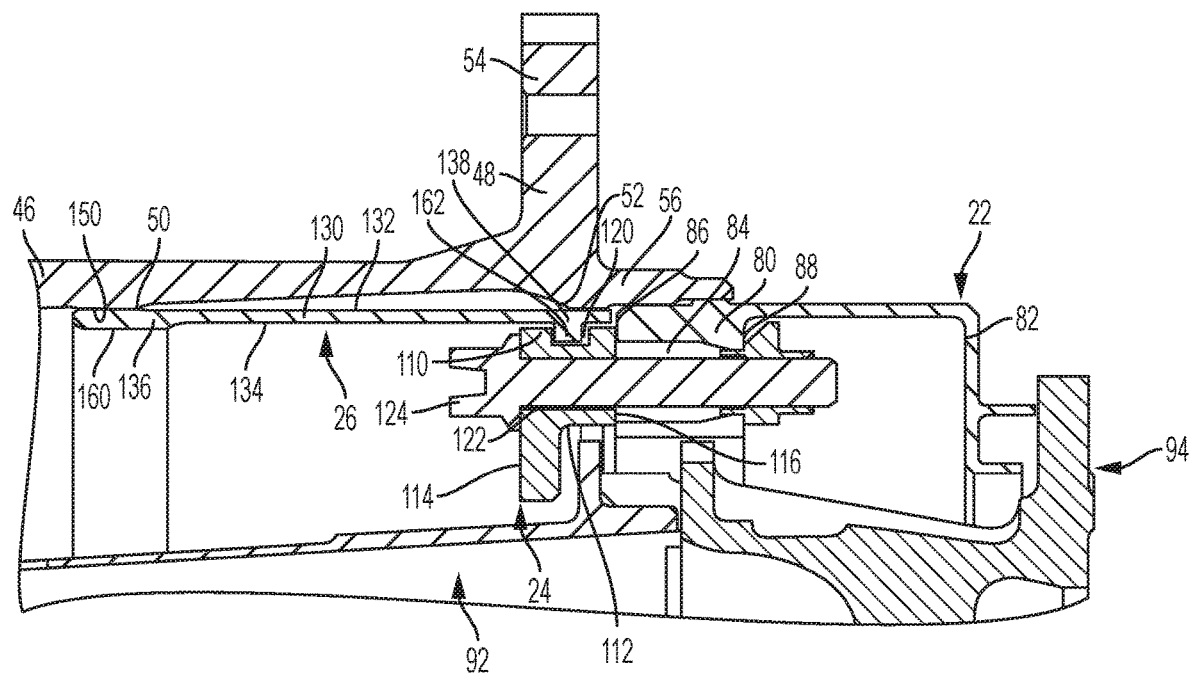
FIG. 3 is a second partial side view of the gas turbine engine proximate the diffuser/combustor section.

Referring to FIGS. 2 and 3, at least a portion of the diffuser section 14, the combustor section 16, and the turbine section 18 are disposed within the case assembly 20. The case assembly 20 includes a first case 32 coupled to a second case 34. The first case 32 and the second case 34 define a cavity 36. The first case 32 includes a first case body 40 having a first case inner surface 42 and a first case outer surface 44 disposed opposite the first case inner surface 42. The first case inner surface 42 and the first case outer surface 44 extend between a first case first end 46 and a first case second end 48.

The first case inner surface 42 defines a first protrusion 50 and a second protrusion 52 spaced apart from the first protrusion 50. The first protrusion 50 is disposed proximate the first case first end 46. The first protrusion 50 extends away from the first case inner surface 42 towards the longitudinal axis 28. The second protrusion 52 is disposed proximate the first case second end 48. The second protrusion 52 extends away from the first case inner surface 42 towards the longitudinal axis 28.

The first case first end 46 may be coupled to another case that at least partially receives the compressor section 12 and the diffuser section 14. The first case second end 48 defines a first flange 54 and a tail portion 56. The first flange 54 extends radially away from the longitudinal axis 28. The first flange 54 extends above the first case outer surface 44. The tail portion 56 extends away from the first flange 54. The tail portion 56 is disposed substantially perpendicular to the first flange 54. The tail portion 56 is disposed substantially parallel to the longitudinal axis 28. In at least one embodiment, the second protrusion 52 is disposed proximate the first flange 54 and the tail portion 56.

In at least one embodiment, an axial stop 58 may be provided. The axial stop 58 is spaced apart from the first case second end 48. The axial stop 58 is disposed between the first case first end 46 and the first case second end 48. The axial stop 58 extends from the first case inner surface 42 towards the longitudinal axis 28. In a further embodiment, a first portion of the axial stop 58 is received within a pocket defined by the first case inner surface 42 and a second portion of the axial stop 58 extends towards the longitudinal axis 28.

The second case 34 may be configured as a high pressure turbine case. The second case 34 includes a second case body 60 having a second case inner surface 62 and a second case outer surface 64 disposed opposite the second case inner surface 62. The second case inner surface 62 and the second case outer surface 64 extends between a second case first end 66 and a second case second end 68. The tail portion 56 engages the second case inner surface 62 proximate the second case first end 66. The second case first end 66 defines a second flange 70. The second flange 70 extends radially away from the longitudinal axis 28. The second flange 70 extends above the second case outer surface 64. The second flange 70 abuts the first flange 54 and the tail portion 56.

A fastener 72 extends through the first flange 54 and the second flange 70 to couple the first flange 54 to the second flange 70. The coupling of the first flange 54 to the second flange 70 defines a flanged member.

The turbine vane support 22 at least partially extends between the combustor section 16 and the turbine section 18. The turbine vane support 22 includes a first portion 80 and the second portion 82. The first portion 80 of the turbine vane support 22 is disposed between at least a portion of the first case 32 and a combustor 92 of the combustor section 16. The first portion 80 defines an opening 84 that extends from a first face 86 of the first portion 80 to a second face 88 of the first portion 80. The second portion 82 of the turbine vane support 22 is disposed between at least a portion of the second case 34 and a turbine vane 94 of the turbine section 18.

Figures 4, 5:
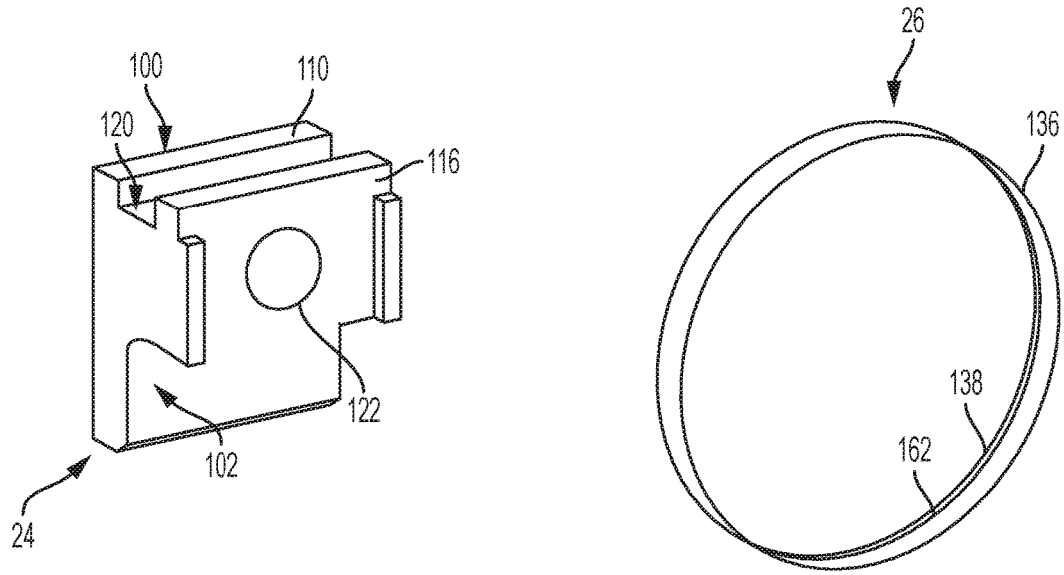
FIG. 4 is a perspective view of a combustor vane support lock.
FIG. 5 is a perspective view of a heat shield.
Figure 6:
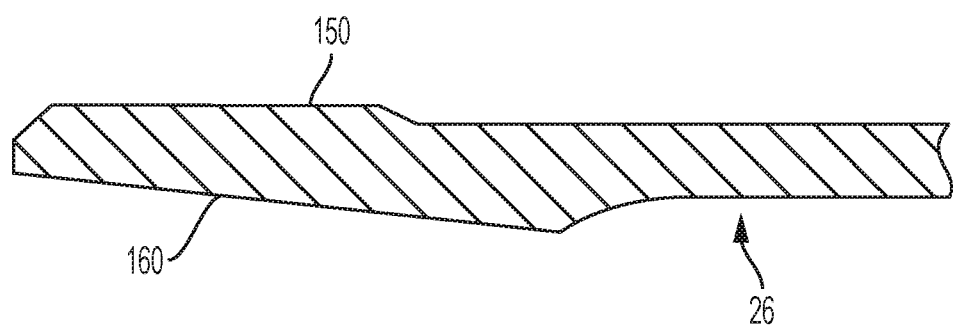
FIG. 6 is a partial perspective view of the heat shield.

Referring to FIGS. 2-4, the combustor vane support lock 24 is disposed adjacent to the turbine vane support 22. The combustor vane support lock 24 includes a body 100 having a tab 102. The body 100 includes a first body surface 110, a second body surface 112, a first body face 114, and a second body face 116. The second body surface 112 is disposed opposite the first body surface 110.

The first body surface 110 and the second body surface 112 are disposed substantially parallel to each other and are disposed substantially parallel to the longitudinal axis 28. The first body face 114 extends between the first body surface 110 and the second body surface 112. The second body face 116 is disposed opposite the first body face 114. The second body face 116 extends between the first body surface 110 and the second body surface 112. The second body face 116 is disposed adjacent to the first face 86 of the turbine vane support 22. The second body face 116 abuts the first face 86 of the turbine vane support 22.

The first body surface 110 defines a slot 120. The slot 120 extends towards the second body surface 112. The slot 120 defines a slot width.

The tab 102 extends from the body 100 towards the longitudinal axis 28. The tab 102 is configured to engage a portion of the combustor 92 in response to an engine surge event to inhibit further movement of the combustor 92 along the longitudinal axis 28.

The body 100 defines a fastener opening 122. The fastener opening 122 extends from the first body face 114 to the second body face 116. The combustor vane support lock 24 is coupled to the turbine vane support 22 by a fastener 124 that extends through fastener opening 122 and the opening 84. At least a portion of the fastener 124 is received within a cavity defined by the second portion 82 of the turbine vane support 22.

The combustor section 16 operates at substantially high temperatures, sometimes in excess of 1000° F. (537° C. or 810 K), that may impact the operational life of components of the gas turbine engine 10. The substantially high temperatures of the combustor section 16 may impact the operational life of the flanged member defined by the first flange 54 and the second flange 70. The heat shield 26 is provided to improve a thermal gradient as a result of the substantially high temperatures of the combustor section 16.

Referring to FIGS. 2-5, the heat shield 26 is disposed between the first case 32 and the combustor 92 of the combustor section 16. The heat shield 26 is disposed adjacent to the turbine vane support 22. The heat shield 26 engages the combustor vane support lock 24. The heat shield 26 is shaped to correspond to the geometry of the case assembly 20 and various other components of the gas turbine engine 10. The heat shield 26 is configured as a substantially circular ring; however other shapes are also contemplated. The heat shield 26 may comprise a plurality of segments or be formed as a continuous structure.

The heat shield 26 includes a heat shield body 130 having an exterior surface 132 and an interior surface 134 disposed opposite the exterior surface 132. The exterior surface 132 and the interior surface 134 extend between a first heat shield end 136 and a second heat shield end 138. The heat shield 26 may be made of a high temperature material that may survive temperature conditions greater than 1200° F. (648° C. or 922K), such as Greek Ascoloy, Waspaloy, Inconel, or the like.

The exterior surface 132 is disposed proximate the first case inner surface 42. The exterior surface 132 is configured to engage the first protrusion 50 and the second protrusion 52 of the first case 32. The first protrusion 50 engages the exterior surface 132 proximate the first heat shield end 136. The second protrusion 52 engages the exterior surface 132 proximate the second heat shield end 138. The first protrusion 50 and the second protrusion 52 are configured as snap locks that locate the heat shield 26 relative to the first case 32.

In at least one embodiment, the axial stop 58 is disposed proximate the first heat shield end 136. The axial stop 58 is configured to axially retain the heat shield 26 from potential axial liberation. The axial stop 58 is configured to inhibit axial movement of the heat shield 26 relative to the first case 32.

Referring to FIGS. 3-6, the exterior surface 132 of the heat shield 26 defines a heat shield protrusion 150. The heat shield protrusion 150 is disposed proximate the first heat shield end 136. The heat shield protrusion 150 is configured to engage the first protrusion 50. The heat shield protrusion 150 and the first protrusion 50 are configured to operate as snap locks to locate the heat shield 26 relative to the first case 32. The snap locks are further configured to provide axial retention of the heat shield 26.

The interior surface 134 of the heat shield 26 faces towards the combustor 92 of the combustor section 16. The interior surface 134 defines a ramped region 160 and a rib 162. The ramped region 160 is disposed proximate the first heat shield end 136. The ramped region 160 extends from the first heat shield end 136 towards the second heat shield end 138. In at least one embodiment, the ramped region 160 is inclined towards the second heat shield end 138. The ramped region 160 provides an aerodynamic effect that improves a pressure drop through the combustor section 16 towards the turbine section 18.

The ramped region 160 also mistake proofs the installation process of the heat shield 26. A thickness of the ramped region 160 is sized such that it cannot be inserted into a region defined by the first case second end 48, the first body surface 110 of the combustor vane support lock 24, and the first face 86 of the turbine vane support 22. This ensures that the heat shield 26 is properly installed, such that the second heat shield end 138 is inserted into the region defined by the first case second end 48, the first body surface 110 of the combustor vane support lock 24, and the first face 86 of the turbine vane support 22.

The rib 162 extends from the interior surface 134 towards the combustor 92 of the combustor section 16. The rib 162 is disposed proximate the second heat shield end 138. The rib 162 is configured as a circumferential rim that extends about an inner diameter of the heat shield 26.

The rib 162 is configured to extend into the combustor vane support lock 24. The rib 162 is received within the slot 120 of the combustor vane support lock 24. The combination of the rib 162 and the slot 120 are configured to axially retain the heat shield 26.

In at least one embodiment, the interior surface 134 of the heat shield 26 is provided with a thermal barrier coating. The thermal barrier coating may be a ceramic matrix composite or other high-temperature alternatives. The thermal barrier coating may extend along an entire length of the interior surface 134 of the heat shield 26. The thermal barrier coating may not extend along the entire length of the interior surface 134 but may extend between the first heat shield end 136 and the second heat shield end 138.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure.

Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A gas turbine engine, comprising:
  a first case having a first case first end and a first case second end, the first case second end defining a first flange;
  a second case having a second case first end and a second case second end, the second case first end defining a second flange that abuts the first flange;
  a turbine vane support extending between a turbine vane and the first case;
  a heat shield disposed adjacent to the turbine vane support, the heat shield having an exterior surface disposed proximate an inner surface of the first case and an interior surface facing towards a combustor; and
  a combustor vane support lock disposed adjacent to the turbine vane support, wherein the heat shield includes a rib engaged into a slot formed in a surface of the combustor vane support lock such that the rib is disposed radially between the slot and the inner surface of the first case, the rib extending radially inwardly from the interior surface of the heat shield.

2. The gas turbine engine of claim 1, wherein the inner surface of the first case defines a first protrusion and defines a second protrusion spaced apart from the first protrusion.

3. The gas turbine engine of claim 2, wherein the first protrusion engages the exterior surface of the heat shield proximate a first heat shield end and the second protrusion engages the exterior surface of the heat shield proximate a second heat shield end.

4. A gas turbine engine, comprising:
  a first case having an inner surface that extends between a first case first end and a first case second end;
  a combustor vane support lock coupled to a turbine vane support by a fastener that extends through the combustor vane support lock and is received within the turbine vane support disposed adjacent to the combustor vane support lock; and
  a heat shield having a first heat shield end, a second heat shield end, an exterior surface that extends between the first heat shield end and the second heat shield end, and an interior surface disposed opposite the exterior surface that extends between the first heat shield end and the second heat shield end, the exterior surface of the heat shield disposed radially inboard of the first case inner surface and the interior surface of the heat shield facing towards a combustor; and
  a rib extending radially inwardly from the interior surface of the heat shield;
  wherein the rib is engaged into a slot formed in a surface of the combustor vane support lock such that the rib is disposed radially between the slot and the inner surface of the first case.

5. The gas turbine engine of claim 4, wherein the rib is disposed proximate the second heat shield end.

6. The gas turbine engine of claim 4, wherein the interior surface of the heat shield defines a ramped region that extends from the first heat shield end towards the second heat shield end.

7. The gas turbine engine of claim 4, wherein the exterior surface of the heat shield defines a heat shield protrusion that is disposed proximate the first heat shield end.

8. The gas turbine engine of claim 4, wherein the inner surface of the first case defines a first protrusion disposed proximate the first case first end and a second protrusion disposed proximate the first case second end.

9. The gas turbine engine of claim 8, wherein the first protrusion engages the exterior surface of the heat shield proximate the first heat shield end and the second protrusion engages the exterior surface of the heat shield proximate the second heat shield end.

10. A heat shield provided with a gas turbine engine, comprising:
  a heat shield body extending between a first heat shield end and a second heat shield end, the heat shield body having:
    an exterior surface disposed radially inboard of an inner surface of a first case,
    an interior surface disposed opposite the exterior surface and the interior surface facing towards a combustor; and
    a rib extending radially inwardly from the interior surface of the heat shield;
  wherein the rib is configured for engagement into a slot formed in a surface of a combustor vane support lock such that the rib is disposed radially between the slot and the inner surface of the first case.

11. The heat shield of claim 10, wherein the rib is disposed proximate the second heat shield end.

12. The heat shield of claim 10, wherein the rib inhibits axial movement of the heat shield relative to the first case.

13. The heat shield of claim 10, wherein the interior surface defines a ramped region that extends from the first heat shield end towards the second heat shield end.

14. The heat shield of claim 10, wherein the interior surface is at least partially provided with a thermal barrier coating.

* * * * *